United States Patent
Wu et al.

(10) Patent No.: US 7,534,741 B2
(45) Date of Patent: May 19, 2009

(54) SUPPORTED NANOCATALYST PARTICLES MANUFACTURED BY HEATING COMPLEXED CATALYST ATOMS

(75) Inventors: Zhihua Wu, Lawrenceville, NJ (US); Zhenhua Zhou, Pennington, NJ (US); Michael Rueter, Plymouth Meeting, PA (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 160 days.

(21) Appl. No.: 11/673,552

(22) Filed: Feb. 9, 2007

(65) Prior Publication Data

US 2008/0193368 A1 Aug. 14, 2008

(51) Int. Cl.
*B01J 23/00* (2006.01)
*B01J 31/00* (2006.01)
*C01B 15/01* (2006.01)

(52) U.S. Cl. .................. 502/300; 502/325; 502/150; 502/159; 502/173; 423/584; 977/775

(58) Field of Classification Search ................ 502/150, 502/159, 173, 300, 325; 423/584; 977/775
See application file for complete search history.

(56) References Cited

U.S. PATENT DOCUMENTS

| 3,992,331 | A | 11/1976 | Petrow et al. ............... 502/339 |
| 4,366,085 | A | 12/1982 | Ikegami et al. .............. 502/155 |
| 4,476,242 | A | 10/1984 | Puskas et al. ............... 502/185 |
| 4,513,098 | A | 4/1985 | Tsao .......................... 502/216 |
| 4,713,363 | A | 12/1987 | Hucul ........................ 502/262 |
| 5,460,734 | A | 10/1995 | Birbara et al. .............. 210/763 |
| 5,580,839 | A | 12/1996 | Huffinan et al. ............. 502/338 |
| 5,641,723 | A | 6/1997 | Bonnemann et al. ........ 502/326 |
| 5,846,898 | A | 12/1998 | Chuang et al. .............. 502/181 |
| 6,090,858 | A | 7/2000 | El-Sayed ..................... 516/97 |
| 6,106,797 | A | 8/2000 | Muller et al. ............... 423/584 |
| 6,159,267 | A | 12/2000 | Hampden-Smith ........... 75/252 |
| 6,168,775 | B1 | 1/2001 | Zhou et al. .................. 423/584 |
| 6,194,338 | B1 | 2/2001 | Andolfatto et al. .......... 502/101 |
| 6,239,054 | B1 | 5/2001 | Shukis et al. ................ 502/29 |
| 6,284,213 | B1 | 9/2001 | Paparatto et al. ............ 423/403 |
| 6,387,346 | B1 | 5/2002 | Bertsch-Frank et al. ..... 423/584 |
| 6,500,968 | B2 | 12/2002 | Zhou et al. .................. 549/531 |
| 6,500,969 | B1 | 12/2002 | Zhou et al. .................. 549/531 |
| 6,534,440 | B2 | 3/2003 | Choudhary et al. ......... 502/333 |
| 6,534,661 | B1 | 3/2003 | Zhou et al. .................. 549/531 |
| 6,551,960 | B1 | 4/2003 | Laine et al. ................. 502/327 |
| 6,576,214 | B2 | 6/2003 | Zhou et al. .................. 423/584 |
| 6,630,118 | B2 | 10/2003 | Paparatto et al. ............ 423/584 |
| 6,676,919 | B1 | 1/2004 | Fischer et al. ............... 423/584 |
| 6,686,308 | B2 | 2/2004 | Mao et al. ................... 502/180 |
| 6,740,615 | B2 | 5/2004 | Zhou .......................... 502/29 |
| 6,746,597 | B2 | 6/2004 | Zhou et al. .................. 208/138 |
| 6,908,873 | B2 | 6/2005 | Zhou et al. .................. 502/29 |
| 6,936,564 | B2 | 8/2005 | Butz et al. ................... 502/150 |
| 7,011,807 | B2 | 3/2006 | Zhou et al. .................. 423/584 |
| 7,045,479 | B2 | 5/2006 | Zhou et al. .................. 502/125 |
| 7,045,491 | B2 | 5/2006 | Parasher et al. | |
| 7,070,757 | B2 | 7/2006 | Fischer et al. ............... 423/584 |
| 2004/0087441 | A1 | 5/2004 | Bock et al. .................. 502/313 |
| 2004/0101718 | A1 | 5/2004 | Cao et al. ..................... 429/13 |
| 2004/0241502 | A1 | 12/2004 | Chung et al. ................ 428/702 |
| 2006/0160695 | A1 | 7/2006 | Zhou et al. | |

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).
Henglein, et al., "Absorption Spectrum and Some Chemical Reactions of Colloidal Platinum in Aqueous Solution," J. Phys. Chern., 99, 14129-14136 (1995).
Petroski, et al., "Kinetically Controlled Growth and Shape Formation Mechanism of Platinum Nanoparticles," J. Phys. Chern. B, 102, 3316-3320 (1998).

*Primary Examiner*—Timothy C Vanoy
*Assistant Examiner*—Daniel Berns
(74) *Attorney, Agent, or Firm*—Workman Nydegger

(57) ABSTRACT

Methods for manufacturing supported catalysts and the use of these catalysts in, e.g., the direct synthesis of hydrogen peroxide. The nanocatalyst particles are manufactured from catalyst atoms complexed with organic agent molecules (e.g., polyacrylic acid). The complexed catalyst atoms are heated to cause formation of the nanocatalyst particles. The temperature used to cause formation of the particles is typically greater than 30° C., preferably greater than 50° C, and more preferably greater than 70° C.

22 Claims, No Drawings

SUPPORTED NANOCATALYST PARTICLES MANUFACTURED BY HEATING COMPLEXED CATALYST ATOMS

BACKGROUND OF THE INVENTION

1. The Field of the Invention

The present invention relates generally to supported catalysts and methods for making and using such catalysts (e.g., in the direct synthesis of hydrogen peroxide). More particularly, the present invention relates to the manufacture of nanocatalyst particles by heating complexed catalyst atoms.

2. The Related Technology

Transition metal (e.g., noble metal) catalysts play a very important role in numerous industrial chemical processes, including petroleum refining, chemical synthesis, and pharmaceuticals manufacturing, among others. Cost pressures and the need for improved synthesis routes have led to continued improvement in catalyst performance. For example, improvements in catalysts for the direct synthesis of hydrogen peroxide using oxygen and hydrogen have led to direct synthesis routes that are now economically feasible compared to the traditional synthesis routes using alkylanthroquinones.

Transition metal catalysts are typically small metal particles or crystallites supported on a support material. Since catalyst performance generally increases with decreased particle size, great efforts have been made to obtain catalysts with very small particle sizes. Recently, particle sizes of less than 10 nm have been achieved for some catalysts.

One important performance characteristic of particle catalysts is selectivity. Many particle catalysts are inherently capable of catalyzing more than one reaction for a given reaction mixture. In many cases, the different reactions are catalyzed by distinct active sites on the catalyst particle. Catalysis is achieved as reactants bond with catalyst atoms at the surface of the particle. The arrangement of the exposed atoms may determine catalytic properties of the catalyst. While one crystal face exposure may catalyze a desired reaction, another crystal face exposure may catalyze an undesired reaction.

Recently, manufacturing techniques have been developed that allow catalyst particles to be formed with very small particle sizes and/or a controlled crystal face exposure using an organic control agent. Examples of these supported nanocatalysts are disclosed in U.S. Pat. Nos. 7,045,479 and 7,011,807. The organic agent molecules are reacted with catalyst atoms in solution to form organometallic complexes. The complexed atoms are then allowed or caused to form a colloidal suspension and subsequently nanoparticles. As the nanoparticles form, the organic agent molecules influence the size and/or crystal face exposure of the particles. Particles formed using this method have shown dramatic improvements in selectivity, reduced particle size, and improved particle stability.

While these recent improvements in catalyst performance have been substantial, there is still a need for improved catalyst synthesis routes and improved catalyst performance.

BRIEF SUMMARY OF THE INVENTION

Embodiments of the invention are directed to methods for manufacturing supported catalysts and the use of these catalysts in, e.g., the direct synthesis of hydrogen peroxide. The nanocatalyst particles are manufactured by reacting catalyst atoms with an organic control agent to form complexed catalyst atoms and then heating the complexed catalyst atoms to cause particle formation. The temperature used to cause formation of the particles is typically greater than 30° C., preferably greater than 50° C., and more preferably greater than 70° C.

In one embodiment, the supported catalysts are manufactured using the following steps: (i) providing a plurality of organic agent molecules having at least one functional group capable of bonding with the catalyst atoms; (ii) reacting the organic agent molecules with a plurality of catalyst atoms in a solvent to form a liquid mixture comprising a plurality of complexed catalyst atoms; (iii) forming a plurality of colloidal nanoparticles in the solvent by heating the mixture to a temperature greater than about 30° C.; and (iv) thereafter depositing the colloidal nanoparticles on a support material to yield a supported catalyst. In this embodiment, the nanoparticles are advantageously formed in the solution. Forming the nanoparticles in solution can be advantageous for forming small and uniformly formed particles.

In an alternative embodiment, the nanocatalyst particles are manufactured using the steps of: (i) providing a plurality of oligomeric or polymeric molecules comprising at least one functional group capable of bonding with catalyst atoms; (ii) reacting a plurality of catalyst atoms with the oligomeric or polymeric molecules in a solvent to form a mixture comprising a plurality of complexed catalyst atoms; (iii) forming a plurality of nanocatalyst particles by heating the complexed catalyst atoms to a temperature greater than about 30° C.; and (iv) supporting the nanocatalyst particles on a support material. This embodiment differs from the first in that the heating step to form the nanocatalyst particles can be performed either in solution or in the presence of the support. The use of a polymer or oligomer as an organic agent has been found to be particularly advantageous for achieving small and uniformly formed particles and/or for achieving a desired crystal face exposure.

The heating step in the methods of the present invention advantageously provides a method for making nanocatalyst particles without using strong reducing agents such as hydrogen or using less hydrogen as compared to similar manufacturing methods performed at lower temperatures. Avoiding the use of hydrogen can be beneficial because hydrogen can be explosive and can therefore be hazardous to work with.

The formation of particles at elevated temperatures (i.e., greater than 30° C.) can surprisingly be carried out without significantly affecting the particle size or particle crystal lattice as compared to methods that use hydrogen to cause particle formation at room temperature. Unexpectedly, forming particles using elevated temperatures has even resulted in catalysts with improved performance compared to catalyst particles prepared using hydrogen at room temperature.

These and other advantages and features of the present invention will become more fully apparent from the following description and appended claims as set forth hereinafter.

DETAILED DESCRIPTION OF EMBODIMENTS OF THE INVENTION

I. INTRODUCTION AND DEFINITIONS

Embodiments of the invention relate to methods for manufacturing supported catalysts and the use of these catalysts in, e.g., the direct synthesis of hydrogen peroxide. The nanocatalyst particles are manufactured from catalyst atoms complexed with organic agent molecules (e.g., polyacrylic acid). The complexed catalyst atoms are heated to cause formation of the nanocatalyst particles. The temperature used to cause formation of the particles is typically greater than 30° C., preferably greater than 50° C., and more preferably greater than 70° C.

The term "crystal face" refers to the top or outer layer of active catalyst atoms within a catalyst crystal. The terms "crystal face exposure" and "crystal face exposition" refer to the specific arrangement of catalyst atoms within a particular crystal face (e.g., low index crystal face exposures (100), (110), and (111)).

The term "particle size" refers to average particle size and "nanoparticle" refers to a particle having a particle size between about 1 nm and about 1000 nm.

The term "nanocatalyst solution" shall be broadly understood to include true solutions, colloids, and suspensions.

II. COMPONENTS USED TO MAKE METAL-CONTAINING COLLOIDS AND SUPPORTED CATALYSTS

A. Metal Ions

Any metals or group of metals that can react to form a complex with the organic control agent molecules can be used to form the complexed catalyst atoms according to the present invention. In a preferred embodiment, the metal is a transition metal. Transition metals include base transition metals, noble metals, and rare earth metals.

Examples of suitable base transition metals include, but are not limited to, titanium, vanadium, chromium, manganese, iron, cobalt, nickel, copper, zinc, zirconium, molybdenum, tin, antimony, tungsten, and the like. These may be used alone, in various combinations with each other, or in combinations with other elements.

Examples of noble metals, also referred to as platinum-group metals, include platinum, palladium, iridium, gold, osmium, ruthenium, rhodium, rhenium, and the like. These may be used alone, in various combinations with each other, or in combinations with other elements.

Examples of rare earth metals include, but are not limited to, lanthanum and cerium. These may be used alone, in various combinations with each other, or in combinations with other elements.

For the manufacture of hydrogen peroxide catalysts, the metal ions typically include palladium and/or platinum.

B. Organic Agents and Organic Agent Molecules

The organic control agent, also referred to as an organic agent, is selected to promote the formation of nanocatalyst particles that have a desired size and/or crystal face exposure. The organic agent molecules react with the metal ions to form ligands complexed with the metal ions. During formation of the metal particles, the organic agent can influence the arrangement and bonding of the metal atoms, thereby causing formation of particles with a particular size and/or crystal face exposure (e.g., (110) type or (111) type).

Organic agents suitable for bonding metal ions include a variety of small organic molecules, polymers and oligomers. The organic agent interacts and bonds with metal ions dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the organic agent molecules and the metal ions, the organic agent molecules include one or more appropriate functional groups. In one embodiment, the functional groups comprise a carbon atom bonded to at least one electron-rich atom that is more electronegative than the carbon atom and that is able to donate one or more electrons so as to form a bond or attraction with a metal ion. Preferred organic agents include functional groups which have either a charge or one or more lone pairs of electrons that can be used to complex a metal ion. These functional groups allow the organic agent to have a strong binding interaction with the metal ions.

In an exemplary embodiment, the functional groups of the organic agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The organic agent can be monofunctional, bifunctional, or polyfunctional.

Examples of suitable monofunctional organic agents include carboxylic acids such as formic acid and acetic acid. Useful bifunctional organic agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional organic agents include sugars such as glucose, polyfunctional carboxylic acids such as citric acid, EDTA, pectins, cellulose, and the like. Other useful organic agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The organic agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

Depending on the desired stability of the nanocatalyst particles on the support material, the organic agent can be selected to bond (e.g., covalently bond) with the support material so as to anchor or tether the nanocatalyst particles and/or atoms to the support material. While the organic agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the metal ions. However, organic agent molecules can have different functional groups for bonding to the support and also for bonding to the metal ions.

The organic agent solution and optionally the support material can control which face of the catalyst crystallite is predominantly exposed. Examples of low-index crystal faces that can be controllably exposed include the (110) crystal face of face centered cubic (FCC) crystal lattice, the (110) crystal face of the hexagonal closed packed (HCP) crystal lattices, the (101), (122), or (120) crystal face of an HCP crystal lattice, and the (112), (122) or (123) crystal face of a body-centered cubic (BCC) crystal lattice. The foregoing crystal face exposures all have a coordination structure where each active surface atom is coordinated with only two other active surface atoms. For purposes of the present invention, these coordination structures are collectively referred to as a "(110) type" crystal face exposure. A predominantly (110) type crystal face exposure has been found to be advantageous for manufacturing hydrogen peroxide.

An organic agent can also be selected to cause formation of other types of coordination structures. For example, the (111) crystal face of the FCC crystal lattice has active surface atoms with six neighboring (i.e., coordinated) surface atoms. Other types of crystal lattices have crystal face exposures with this type of coordination structure. For purposes of the present invention, these coordination structures are collectively referred to as "(111) type" crystal face exposure.

In all of the above crystal face designations, it will be understood by those skilled in the art that each named crystal face has many alternate Miller index designations, each of which are equivalent to those listed above (e.g., the (101) and (011) crystal faces of the FCC lattice are equivalent to the (110) crystal face). All of the unnamed but equivalent crystal face designations are understood to be included within the definitions of a "(111) type" or a "(110) type" crystal face exposure.

It is, at least theoretically, not essential for the catalytically active atoms to form a catalyst crystal per se, only that a preponderance of the top or outer layer of atoms in the catalyst particles attached to the support have the desired coordination structure. It may be possible to obtain increased reaction specificity regardless of whether the atoms are aligned as straight rows, in a zig-zag formation, or in less ordered rows having no uniform shape so long as the desired coordination structure is achieved. According to one embodiment, at least about 50% of the catalytically active atoms in the nanocatalyst particles will advantageously have the selected crystal face exposure (i.e., coordination structure). More preferably at least about 70%, even more preferably about 90%, and most preferably at least about 95% of the active surface atoms will have the selected crystal face exposure. Reaction selectivity would theoretically be expected to be maximized in the case where 100% of the active surface atoms have the desired crystal face exposure.

C. Solvents and Chemical Modifiers

The nanocatalyst particles are prepared in a solution that can be applied to a catalyst support material. The nanocatalyst solution can contain various solvents, including water and organic solvents. Solvents participate in catalyst formation by providing a solution for the interaction of metal ions and the organic agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the nanocatalyst solution. For example, acids or bases may be added to adjust the pH of the mixture. It is also possible to add acids and bases as a solid material. For example, ion exchange resins that have basic or acid functional groups can be used. The solid material can be easily separated from the final colloid using simple techniques such as centrifugation and filtration. Surfactants may be added to adjust the surface tension of the mixture, or to stabilize the nanoparticles.

E. Reducing Agent

A reducing agent in combination with heating above 30° C. can be used to reduce complexed metal ions to a lower oxidation state. Reducing the metal atoms while heating causes at least partial formation of the nanoparticles. Any compound capable of reducing the complexed metal ions can be used. In one embodiment the organic agent used to complex the catalyst atoms can serve as a reducing agent. If desired, excess organic agent can be included in the nanocatalyst solution (i.e., a molar ratio of organic agent to metal atoms greater than 1).

Alternatively, additional reducing agent can be added to the nanocatalyst solution. Suitable reducing agents include hydrogen, small organic molecules such as formaldehyde, formic acid, methanol, ethylene, and hydrides such as lithium aluminum hydride and sodium borohydride.

F. Support Materials

The nanocatalyst particles are formed or deposited on a catalyst support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

In a preferred embodiment the surface area of the support is at least about 50 $m^2/g$, more preferably 100 $m^2/g$, and most preferably 150 $m^2/g$. Particulate supports can have a diameter in a range from about 100 nm to about 20 mm, alternatively from about 1 mm to about 10 mm, or in yet another embodiment from about 1 mm to about 5 mm.

III. METHODS OF MAKING SUPPORTED CATALYST

Example methods for manufacturing supported nanocatalyst according to the invention can be broadly summarized as follows. First, a catalyst precursor solution is prepared from a liquid solvent, a plurality of catalyst atoms, and an organic agent. Second the precursor solution is heated to cause formation of nanocatalyst particles. Third the nanocatalyst particles are supported on a support material. Fourth, the supported catalyst is optionally dried and/or activated for use. In an alternative embodiment in the case where a polymer or oligomer organic agent is used, the catalyst precursor solution can be applied to the support before causing formation of the nanocatalyst particles by heating.

B. Nanocatalyst Solution

The nanocatalyst solution is generally formed by first dissolving the catalyst atoms and organic agent in an appropriate solvent or carrier and allowing the catalyst atoms to recombine as metal complexes.

The catalyst atoms can be provided in any form so as to be soluble or dispersible in the solvent or carrier that is used to form the catalyst precursor. For example, catalyst atoms can be provided as metal salts that are readily dissolvable in the solvent or carrier. It may be advantageous to use metal chlorides and nitrates, since metal chlorides and nitrates are typically more soluble than other metal salts.

The catalyst atoms can be added to the solvent or carrier singly or in combination. In general, the composition of the primary metal nanoparticles will be determined by the types of catalyst atoms added to the precursor solution. Therefore, control of the amounts of metal salts added to the precursor solution provides a convenient method to control the relative concentrations of different types of catalyst atoms.

The organic agent can be selected to promote formation of nanoparticles with a desired size and/or crystal face exposure.

It has been found that straight chain oligomers and polymers have a tendency to form particles with a (110) type crystal face exposure (e.g., unbranched polyacrylic acid). If a (111) type crystal face exposure is desired, small organic molecules or highly branched polymers can be used (e.g., glycolic acid).

When preparing a catalyst for use in direct hydrogen peroxide synthesis, the organic agent is advantageously selected to form catalyst particles with a (110) type crystal face exposure. An example of a suitable organic agent for forming nanoparticles with selective (110) crystal face exposure is polyacrylic acid having a molecular weight of about 1200 MW and minimal or no branching.

The organic agent is added to the solvent or carrier in a manner so as to facilitate association of the organic agent with the catalyst atoms in order to form the catalyst precursor. Some organic agents may themselves be soluble in the solvent or carrier. In the case of organic agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

In addition to the characteristics of the organic agent, it can also be advantageous to control the molar ratio of organic agent to the catalyst atoms in a catalyst suspension. A more useful measurement is the molar ratio between organic agent functional groups and catalyst atoms. For example, in the case of a divalent metal ion two molar equivalents of a monovalent functional group would be necessary to provide the theoretical stoichiometric ratio. Typically the molar ratio of organic agent functional groups to catalyst atoms is preferably in a range of about 0.001:1 to about 50:1. For hydrogen peroxide catalysts the ratio is advantageously in a range of about 0.5:1 to about 40:1, more preferably in a range from about 1:1 to about 35:1, and most preferably in a range of about 3:1 to about 30:1.

C. Heating the Complexed Catalyst Atoms to Form Nanoparticles

Once the metal atoms are complexed, the metal complexes are allowed or caused to form nanoparticles by heating. The temperature needed to cause particle formation generally depends on the solvent, metal atoms, and organic agent being used. In one embodiment, particle formation is carried out in the nanocatalyst solution at a temperature greater than about 30° C., preferably greater than about 50° C., more preferably greater than about 70° C., and alternatively greater than 90° C. In yet another alternative embodiment, the heating is conducted in a range from about 30° C. to about 120° C., or in a range from about 50° C. to about 100° C. If the desired temperature is above the boiling point of the solvent, it may be advantageous to use a reaction pressure above atmospheric pressure to prevent boiling and/or excessive loss of solvent.

In addition to maintaining a desired temperature, particle formation can optionally be facilitated by using one or more reducing agents. Preferred reducing agents include small organic molecules. Strong reducing agents can be used if desired, however, there use is typically not needed with sufficient heating. In many cases no additional reducing agent is needed since an excess of the organic control agent can serve as a reducing agent.

In most cases, especially in the case where the organic control agent is a small or smaller molecule (i.e., has a molecular weight less than about 1000), particle formation is typically carried out in solution and not in the presence of the support material. Even when the organic control agent is an oligomer or polymer (i.e., has a molecular weight of about 1000 or greater), it may be desirable to form the particles by heating in solution in the absence of the support material. It is believed that the free movement of the organic agent can allow for optimal control of particle formation.

However, particle formation can in some cases be carried out in the presence of the support material, but typically where the organic control agent is an oligomer or polymer (e.g., polyacrylic acid) having a molecular weight of least about 500, more preferably 1000. It is believed that in some cases oligomers and polymers may facilitate particle formation in the presence of a support material because of the larger number of functional groups, which may provide improved, simultaneous interaction with both the support material and the catalyst metal atoms.

C. Impregnating Support Material with Nanocatalyst Solution

The nanocatalyst solution is impregnated into or otherwise applied to the pre-treated support material. Depending on the physical form of the solid support, the process of contacting or applying the nanocatalyst solution to the support may be accomplished by a variety of methods. For example, the support may be submerged or dipped into the nanocatalyst solution. Alternatively, the nanocatalyst solution may be sprayed, poured, painted, or otherwise applied to the support, such as by incipient wetness impregnation. Thereafter, the solvent or carrier is removed, optionally in connection with a reaction step that causes the organic agent to become chemically bonded or adhered to the support. Either way, the process yields a supported catalyst or an intermediate supported catalyst composition.

Metal loadings of the catalyst component on the support material can vary depending on the intended use of the supported catalyst. In a preferred embodiment, the metal loading is between about 0.01% and about 10% by weight, and more preferably between about 0.05% and about 5% by weight. These loading amounts are useful for catalysts for direct synthesis of hydrogen peroxide, for example. In many cases it can be advantageous to have metal loadings of at least about 0.1 wt %.

The use of the organic agent allows for the formation of very small and uniform nanoparticles. In general, the nanocatalyst particles formed in the presence of the organic agent are preferably less than about 20 nm in size. In some cases, the nanocatalyst particles may be atomically dispersed. The nanocatalyst particles more preferably have an average particle size less than about 15 nm, and most preferably less than about 10 nm.

D. Activating Nanocatalyst Particles

If desired, the catalyst nanoparticles can be further reduced to activate the catalyst prior to use. This reduction step is typically performed after the nanocatalyst particles have been deposited onto the support material and the solvent has been removed.

Examples of suitable reducing agents for catalyst activation include, but are not limited to, hydrogen, lithium aluminum hydride, sodium hydride, sodium borohydride, sodium bisulfite, sodium thiosulfate, hydroquinone, methanol, aldehydes, carbon monoxide, ammonia, and the like. Hydrogen is preferred. The reduction process may be conducted at a temperature between 20° C. and 600° C.

IV. METHODS OF MANUFACTURING HYDROGEN PEROXIDE

The supported catalysts of the present invention are particularly advantageous for the direct synthesis of hydrogen peroxide from hydrogen and oxygen. In a preferred embodiment, hydrogen peroxide promoting catalysts manufactured according to the present invention include a combination of palladium and platinum. In addition, the catalyst nanoparticles are preferably controllably formed to have a (110) type crystal face exposure.

The catalysts of the present invention can be used in any type of reactor suitable for the direct synthesis of hydrogen peroxide. Suitable reactors include fixed bed, ebullated bed, and slurry reactors. In a preferred embodiment, the catalysts of the present invention are loaded into a fixed bed or ebullated bed reactor for hydrogen peroxide production. The use of the catalysts of the present invention in a fixed bed or ebullated bed reactor facilitates the recovery and regeneration of the catalyst. Furthermore, maintaining the structural integrity of the support using the pretreatment step of the invention is particularly advantageous for using the supported catalysts in fixed bed and ebullated bed reactors.

To load the catalysts in a fixed bed or ebullated bed reactor, the supported catalysts are manufactured to have a size and/or shape suitable for a fixed bed or ebullated bed. For example, the supported catalysts can be manufactured into particulates such as beads or spheres that have a size suitable for use in a fixed bed or fluidized bed reactor. In an exemplary embodiment, the particulate has a nominal dimension of at least about 0.5 mm, and more preferably at least about 1 mm. Alternatively, the support material can be extruded to make a part with dimensions that are suitable for use in any size or shaped fixed bed reactor.

Extruding, crushing or otherwise shaping the support material for use in a particular type of reactor is typically done before supporting the nanocatalyst onto the support material such that the nanocatalyst particles are distributed over substantially the entire support surface that is exposed in the reactor.

Once the supported catalyst is placed into a suitable reactor, hydrogen peroxide can be directly synthesized by introducing a feedstream of hydrogen gas and molecular oxygen. In an exemplary embodiment, hydrogen is introduced into the reactor in a concentration less than the flammability limit of hydrogen. The oxygen concentration preferably ranges from about 5% to about 97% by volume, more preferably from about 10% to about 80%, and most preferably from about 20% to about 60%. For concentrations of oxygen greater than about 25%, it is advantageous to use an inorganic support to avoid oxidation of the support.

The supported catalysts of the present invention have metal loadings and suitable activity for the efficient production of hydrogen peroxide at low hydrogen concentrations. Because the metal component of the catalyst material is anchored to the support material, the supported catalysts have extended life and are easily recovered and regenerated. For reactors such as fixed bed and fluidized bed reactors, the supported catalysts are particularly easy to recover, thereby reducing ongoing cost of hydrogen peroxide production.

V. EXAMPLES

The following examples provide exemplary procedures for manufacturing supported catalyst according to the invention and for manufacturing hydrogen peroxide using these catalysts.

Example 1

Preparation of Nanocatalyst Solution

Example 1 provides a method for making a nanocatalyst solution according to one embodiment of the invention. 1.7962 g of an aqueous solution of $PdCl_2$ (25.10% w/w as Pd) and 22.55 g of an aqueous solution of $H_2PtCl_6$ (0.04% w/w as Pt) solution were mixed and then diluted to 100 g total weight using DI water. An additional 50 g of water was then added to the Pt/Pd solution. 11.31 g of an aqueous solution of polyacrylic acid sodium salt (45 wt % sodium polyacrylate, MW ca. 1200) was diluted to 100 g. The polyacrylate solution was then added to the Pd/Pt solution by dropwise addition with continuous stirring. Finally, an additional 50 g of water was added to the Pt/Pd and polyacrylate solution.

Example 2

Comparative Method

Example 2 describes a method forming nanocatalyst particles at room temperature using hydrogen for purposes of comparison to the methods of the present invention (which use heating at temperatures greater than room temperature). A mixture made according to the method of Example 1 was purged for 2 hours with a flow of 100 sccm of nitrogen, and then purged with a flow of 100 sccm of hydrogen overnight. The solution turned black, indicating the formation of suspended nanoparticles of precious metal.

Example 3

Preparation of Nanoparticles at 80° C.

Example 3 describes a method for forming nanocatalyst particles using heating and no additional reducing agent. In example 3, a mixture prepared according to Example 1 was purged with nitrogen at about 100 sccm for 2 hours. The mixture was then heated to 80° C. and held for 2 hours. The solution turned black, indicating the formation of reduced particles of precious metal.

Example 4

Preparation of Nanoparticles at 80° C. Followed by $H_2$ Reduction

The liquid mixture of Example 3 was cooled down to room temperature while continuously purging with nitrogen gas at 100 sccm. Once cooled, the gas feed was then switched to hydrogen at 100 sccm. Hydrogen feed was continued overnight.

Examples 5 and 6

Preparation of Supported Catalysts

Examples 5 (comparative) and example 6 describe supported catalysts manufactured using the respective nanocatalyst solutions of Examples 2 and 3. For each of Examples 2 and 3, 50.00 g of silica beads (supplied by St. Gobain) was pre-soaked with 100 ml of water for 1 h followed by the removal of excess water. Thereafter, 83.3 g of the nanocatalyst solution from each of Examples 2 and 3 was added to the respective pre-soaked solid. The liquid/solid mixtures were separately placed in a rotary drying apparatus and dried with continuous rotation for about 1 hour and then placed in a drying-oven at 110° C. for 6 hours.

The dried solid for each of Examples 5 and 5 was then treated in a tubular reactor as follows:

(1) Start continuous hydrogen feed,
(2) raise temperature from ambient temperature to 90° C. in 30 minutes,
(3) hold for 2 hours at 90° C.,
(4) raise temperature from 90° C. to 300° C. in 2 hours,
(5) hold for 17 hours at 300° C.,
(6) cool down to 150° C.,
(7) switch feed gas from hydrogen to nitrogen,
(8) hold for 5 hours at 150° C.,
(9) cool down to room temperature

Example 7

Preparation of Preparation of Supported Catalyst

Example 7 describes the preparation of a supported catalyst using the nanocatalyst solution of example 1 and forming particles after the nanocatalyst solution is deposited on the support. In Example 7, a nanocatalyst solution manufactured according to Example 1 was deposited on 50.00 g of silica beads (supplied by St. Gobain) and treated in the same manner as described in Examples 5 and 6.

Example 8

Preparation of Hydrogen Peroxide

Catalysts prepared according to Examples 5-7 were used for the direct synthesis of hydrogen peroxide in a continuous feed fixed bed apparatus. For each of Examples 5-7, 7 ml of the supported catalyst was charged to a tubular fixed bed reactor with a nominal diameter of 0.5 inches. The tubular reactor was operated at a pressure of 750 psig, and maintained at an internal temperature of 35° C. The tubular reactor was fed continuously with 2000 sccm (standard cubic centimeters per minute) of a gas feed containing 3 vol % hydrogen, 40 vol % oxygen, and the balance inert gas. The reactor was also fed continuously with 36 cc/hr of a liquid feed containing 4 wt % water, 650 ppmw $H_2SO_4$, and 15 ppmw NaBr and the balance methanol. Gaseous and liquid effluents from the tubular reactor were collected continuously, and analyzed to obtain data on the amount of hydrogen converted and the amounts of hydrogen peroxide and water generated. Catalyst productivity was calculated as the amount of $H_2O_2$ produced (in grams) per hour, divided by the total weight of catalyst in the reactor (in grams). Selectivity was calculated as the amount of $H_2O_2$ produced (in moles) divided by the sum of the amounts of $H_2O_2$ and $H_2O$ produced (both in moles), then multiplied by 100%. Results were obtained as shown in the following table:

| Supported Catalyst | Time On-Stream (hrs) | Productivity (g $H_2O_2$/g cat/hr) | Selectivity (%) | $H_2O_2$ in Product (wt %) |
|---|---|---|---|---|
| Example 5 (Comparative) | 115 | 0.58 | 65.0% | 6.5% |
| Example 6 | 120 | 0.624 | 66.5% | 7.0% |
| Example 7 | 42 | 0.51 | 60.4% | 5.7% |

As shown in the foregoing table, supported catalyst having nanoparticles formed using heating and formed without hydrogen or other additional reducing agent (Example 6), had superior results to the comparative catalyst of Example 5, which had particles that were formed at room temperature. Surprisingly, nanocatalyst particles formed in solution by heating had both superior productivity and superior selectivity compared to nanocatalyst particles formed at room temperature. These superior characteristics resulted in a more valuable product stream having a higher weight percent of hydrogen peroxide. Higher concentrations of hydrogen peroxide in the product stream are particularly beneficial in cases where the entire product stream is used in a downstream synthesis reaction. For example, product streams manufactured using the catalysts of the invention are suitable for use in oxidative reactions such synthesis reactions using hydrogen peroxide to produce, for example, propylene oxide.

Although the selection and productivity of Example 7 was lower than in comparative Example 5, Example 7 produced a suitable catalyst in the presence of a support material while using no hydrogen during the reduction. Thus, this configuration is advantageous where the use of hydrogen or high concentrations of hydrogen is not desired and where other performance characteristics of the catalyst are benefited by carrying out particle formation in the presence of the support material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a supported nanocatalyst, comprising,
   (i) providing a plurality of catalyst atoms and a plurality of organic agent molecules, each organic agent molecule comprising at least one functional group capable of bonding with the catalyst atoms;
   (ii) reacting the plurality of catalyst atoms with the organic agent molecules in a solvent to form a mixture comprising a plurality of complexed catalyst atoms;
   (iii) forming a plurality of nanoparticles in the solvent by heating the mixture to a temperature greater than about 30° C.; and
   (iv) thereafter depositing the nanoparticles on a support material to yield a supported catalyst.

2. A method as in claim 1, wherein the nanoparticles are formed in solution by heating the mixture to a temperature greater than about 50° C.

3. A method as in claim 1, where the nanoparticles are formed in solution by heating the mixture to a temperature greater than about 70° C.

4. A method as in claim 1, where the nanoparticles are formed in solution by heating the mixture to a temperature greater than about 90° C.

5. A method as in claim 1, wherein the solvent comprises water.

6. A method as in claim 1, wherein the organic agent comprises molecules having a molecular weight less than about 1000.

7. A method as in claim 1, wherein the organic agent comprises oligomer or polymer molecules having a molecular weight greater than about 1000.

8. A method as in claim 1, in which the organic control agent molecules bond to the primary catalyst atoms though at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

9. A method as in claim 1, wherein the dispersing agent comprises polyacrylic acid or a salt thereof.

10. A method as in claim 1, wherein at least a portion of the metal atoms are platinum and/or palladium.

11. A hydrogen peroxide catalyst manufactured according to the method of claim 1.

12. A hydrogen peroxide product stream manufacture by reacting together hydrogen and oxygen in the presence of the catalyst of claim 11.

13. A method for manufacturing a supported nanocatalyst, comprising,
   (i) providing a plurality of catalyst atoms and a plurality of oligomeric or polymeric molecules comprising at least one functional group capable of bonding with the catalyst atoms;
   (ii) reacting the plurality of catalyst atoms with the oligomeric or polymeric molecules in a solvent to form a mixture comprising a plurality of complexed catalyst atoms;
   (iii) forming a plurality of nanocatalyst particles by heating the complexed catalyst atoms to a temperature greater than about 30° C.; and
   (iv) supporting the plurality of nanocatalyst particles on a support material.

14. A method as in claim 13, wherein the nanocatalyst particles are formed by heating the complexed catalyst atoms to a temperature greater than about 50° C.

15. A method as in claim 13, wherein the nanocatalyst particles are formed by heating the complexed catalyst atoms to a temperature greater than about 70° C.

16. A method as in claim 13, wherein the nanocatalyst particles are formed by heating the complexed catalyst atoms to a temperature greater than about 90° C.

17. A method as in claim 13, wherein the oligomeric or polymeric molecules are highly branched.

18. A method as in claim 13, wherein the oligomeric or polymeric molecules are substantially straight chain.

19. A method as in claim 13, wherein the dispersing agent molecules comprise polyacrylic acid or a salt thereof.

20. A method as in claim 13, wherein step (iii) is performed prior to step (iv).

21. A method as in claim 13, wherein step (iv) is performed prior to step (iii).

22. A hydrogen peroxide catalyst manufactured according to the method of claim 13.

* * * * *

UNITED STATES PATENT AND TRADEMARK OFFICE
CERTIFICATE OF CORRECTION

PATENT NO. : 7,534,741 B2 Page 1 of 1
APPLICATION NO. : 11/673552
DATED : May 19, 2009
INVENTOR(S) : Wu et al.

It is certified that error appears in the above-identified patent and that said Letters Patent is hereby corrected as shown below:

<u>Column 8</u>
Line 11, change "of least" to --of at least--

<u>Column 10</u>
Line 6, change "catalyst" to --catalysts--

<u>Column 11</u>
Line 11, change the second "5" to --6--

<u>Column 12</u>
Line 11, change "supported catalyst" to --the supported catalyst--

<u>Column 13</u>
Line 13, change "though" to --through--
Line 25, change "manufacture" to --manufactured--

Signed and Sealed this

Seventh Day of July, 2009

JOHN DOLL
*Acting Director of the United States Patent and Trademark Office*